US010216982B2

(12) United States Patent
Pejsa et al.

(10) Patent No.: US 10,216,982 B2
(45) Date of Patent: Feb. 26, 2019

(54) PROJECTING A VIRTUAL COPY OF A REMOTE OBJECT

(71) Applicant: Microsoft Technology Licensing, LLC, Redmond, WA (US)

(72) Inventors: Tomislav Pejsa, Madison, WI (US); Andrew Wilson, Seattle, WA (US); Hrvoje Benko, Seattle, WA (US); Eyal Ofek, Redmond, WA (US); Julian Kantor, Los Angeles, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 199 days.

(21) Appl. No.: 14/656,160

(22) Filed: Mar. 12, 2015

(65) Prior Publication Data

US 2016/0267642 A1    Sep. 15, 2016

(51) Int. Cl.
| | | |
|---|---|---|
| *G06T 7/00* | (2017.01) | |
| *G06T 11/20* | (2006.01) | |
| *G06T 7/60* | (2017.01) | |
| *G06K 9/00* | (2006.01) | |
| *H04N 7/15* | (2006.01) | |
| *G06K 9/46* | (2006.01) | |
| *G06K 9/52* | (2006.01) | |
| *G06T 3/60* | (2006.01) | |
| *G06F 3/01* | (2006.01) | |

(52) U.S. Cl.
CPC .......... *G06K 9/00335* (2013.01); *G06F 3/011* (2013.01); *G06K 9/00671* (2013.01); *G06K 9/4652* (2013.01); *G06K 9/52* (2013.01); *G06T 3/60* (2013.01); *G06T 7/60* (2013.01); *G06T 11/20* (2013.01); *H04N 7/15* (2013.01); *H04N 7/157* (2013.01); *G06T 2200/04* (2013.01); *G06T 2207/30196* (2013.01); *G06T 2207/30244* (2013.01)

(58) Field of Classification Search
None
See application file for complete search history.

(56) References Cited

U.S. PATENT DOCUMENTS

| 7,119,829 B2 | 10/2006 | Leonard et al. |
| 7,136,090 B1 | 11/2006 | McDuffie White |

(Continued)

OTHER PUBLICATIONS

Kato et al Marker tracking and HMD calibration for a video based augmented reality conferecing system, Oct. 1999.*

(Continued)

*Primary Examiner* — Iman K Kholdebarin
(74) *Attorney, Agent, or Firm* — International IP Law Group, PLLC

(57) ABSTRACT

Various systems and methods for projecting a remote object are described herein. In one example, a method includes collecting environment data corresponding to a local environment in which a system is located and detecting a remote object corresponding to a remote user in a remote environment. The method can also include detecting a viewpoint of a local user in the local environment, and projecting the remote object corresponding to the remote user in the local environment based on the viewpoint of the local user, the virtual copy of the remote object to be positioned in the local environment by taking into account geometry of local objects in the local environment.

22 Claims, 5 Drawing Sheets

(56) References Cited

U.S. PATENT DOCUMENTS

| | | | |
|---|---|---|---|
| 7,209,160 B2 | 4/2007 | McNelley et al. | |
| 7,310,712 B1* | 12/2007 | Gordon | G06F 12/0802 711/161 |
| 7,327,361 B2* | 2/2008 | Shimamura | A63F 13/10 345/422 |
| 8,208,007 B2 | 6/2012 | White | |
| 8,223,186 B2 | 7/2012 | Derocher et al. | |
| 8,300,078 B2 | 10/2012 | Lovhaugen et al. | |
| 8,692,861 B2 | 4/2014 | Liu et al. | |
| 8,860,729 B2* | 10/2014 | Epps | G06T 13/40 345/419 |
| 2005/0104879 A1* | 5/2005 | Kaye | G06T 3/00 345/419 |
| 2007/0248261 A1* | 10/2007 | Zhou | G06F 19/321 382/154 |
| 2009/0099824 A1* | 4/2009 | Falash | G09B 9/00 703/8 |
| 2009/0293012 A1* | 11/2009 | Alter | G01C 21/20 715/810 |
| 2010/0241998 A1* | 9/2010 | Latta | G06F 3/011 715/862 |
| 2011/0181685 A1 | 7/2011 | Saleh et al. | |
| 2011/0214082 A1* | 9/2011 | Osterhout | G02B 27/017 715/773 |
| 2012/0038739 A1 | 2/2012 | Welch et al. | |
| 2012/0105473 A1* | 5/2012 | Bar-Zeev | G02B 27/017 345/633 |
| 2012/0120071 A1* | 5/2012 | Thorn | G06T 15/506 345/420 |
| 2012/0249741 A1* | 10/2012 | Maciocci | G06F 3/011 348/46 |
| 2012/0320157 A1 | 12/2012 | Junuzovic et al. | |
| 2012/0320158 A1 | 12/2012 | Junuzovic et al. | |
| 2013/0044130 A1* | 2/2013 | Geisner | G09G 5/00 345/633 |
| 2013/0083011 A1* | 4/2013 | Geisner | G09G 5/00 345/419 |
| 2013/0083064 A1* | 4/2013 | Geisner | G06F 17/30047 345/633 |
| 2013/0335405 A1* | 12/2013 | Scavezze | G06T 19/20 345/419 |
| 2013/0342570 A1* | 12/2013 | Kinnebrew | G09G 3/003 345/633 |
| 2014/0232816 A1 | 8/2014 | Wilson et al. | |
| 2014/0333666 A1* | 11/2014 | Poulos | G06T 19/006 345/633 |
| 2014/0368532 A1* | 12/2014 | Keane | G02B 27/017 345/619 |
| 2014/0369558 A1* | 12/2014 | Holz | G06K 9/00201 382/103 |
| 2015/0123891 A1* | 5/2015 | Tu | G06F 3/017 345/156 |
| 2016/0069643 A1* | 3/2016 | Lyren | G09B 19/0038 345/589 |

OTHER PUBLICATIONS

Kato, H. et al : "Marker tracking and HMD calibration for a video-based augmented reality conferencing system", Augmented Reality, 1999. (IWAR 1 99). Proceedings.2nd IEEE and ACM International Workshop on San Francisco, CA, USA Oct. 20-21, 1999, Los Alamitos , CA, USA, IEEE Comput .soc, us, Oct. 20, 1999 (Oct. 20, 1999), pp. 85-94, XP018358756,DOI: 10.1109/IWAR .1999.803809.

Feng, Zhou et al: "Trends in augmented reality tracking, interaction and display: A review often years of ISMAR" , Mixed and Augmented Reality, 2008.ISMAR 2008.7th IEEE/ACM International Symposium on, IEEE, Piscataway, NJ, USA, Sep. 15, 2008 (Sep. 15, 2008), pp. 193-202, XP031344009, DOI: 10.1109/ISMAR .2008. 4637362 ISBN: 978-1-4244-2840-3 paragraph [5.3.2].

Prince, S. et al : "3D live: real time captured content for mixed reality", Proceedings / International Symposium on Mixed and Augmented Rality :ISMAR. 2002 ; Sep. 30-Oct. 1, 2002, Darmstadt, Germany, IEEEE Computer Society, Los Alamitos, Calif. [U.A .], Sep. 30, 2002 (Sep. 30, 2002), pp. 7-317, XP010620937, ISBN: 978-0-7695-1781-0.

David E. Breen et al: "Interactive Occlusion and Collision of Real and Virtual Objects in Augmented Reality", Technical report ECRC-95-02, Jan. 1, 1995 (Jan. 1, 1995), XP055048041,DOI: 10.1.1.38. 113 Retrieved from the Internet: URL:http://citeseerx.ist.psu.edu/viewdoc/download?doi=10.1.1.38.113&rep=repl&type=pdf [retrieved on Dec. 17, 2012].

Search Report Issued in PCT Application No. PCT/US2016/019442, dated Feb. 25, 2016, 13 pages.

Apostolopoulos, et al., "The Road to Immersive Communication", In Proceedings of the IEEE, vol. 100, Issue, 4, Feb. 16, 2012, 17 pages.

Argyle, et al., "Eye Contact, Distance and Affiliation", In Proceedings of Sociometry, vol. 28, Issue 3, Sep. 1965, pp. 289-304.

Benko, et al., "MirageTable: Freehand Interaction on a Projected Augmented Reality Tabletop", In Proceedings of the SIGCHI Conference on Human Factors in Computing Systems, May 5, 2012, pp. 199-208.

Benko, et al., "Dyadic Projected Spatial Augmented Reality", In Proceedings of the 27th annual ACM Symposium on User Interface Software and Technology, Oct. 5, 2014, pp. 645-655.

Burgoon, et al., "Relational Messages Associated with Nonverbal Behaviors", In Proceedings of Human Communication Research, vol. 10, Issue 3, Mar. 1984, 3 pages.

Buxton, Bill, "Mediaspace—Meaningspace—Meetingspace", In Proceedings of Media Space 20+ Years of Mediated Life, Oct. 29, 2014, 13 pages.

Carifio, et al., "Resolving the 50-Year Debate around Using and Misusing Likert Scales", In Proceedings of Medical Education, Dec. 2008, pp. 2 pages.

Dean, et al., "Refining Personal and Social Presence in Virtual Meetings", In Proceedings of the Fifteenth Australasian User Interface Conference, Jan. 20, 2014, 9 pages, Auckland, New Zealand.

Dou, et al., "Room-sized Informal Telepresence System", In Proceedings of IEEE Virtual Reality, Mar. 4, 2012, pp. 15-18, Orange County, CA, USA.

Gutwin, et al., "A Descriptive Framework of Workspace Awareness for Real-Time Groupware", In Journal Computer Supported Cooperative Work, vol. Issue 3, Nov. 7, 2002, pp. 411-446.

Ichikawa, et al., "MAJIC Videoconferencing System: Experiments, Evaluation and Improvement", In Proceedings of the Fourth European Conference on Computer-Supported Cooperative Work, Sep. 10, 1995, pp. 279-292.

Ishii, et al., "ClearBoard: A Seamless Medium for Shared Drawing and Conversation with Eye Contact", In Proceedings of the SIGCHI Conference on Human Factors in Computing Systems, May 3, 1992, pp. 525-532.

Jones, et al., "Achieving Eye Contact in a One-to-Many 3D Video Teleconferencing System", In Journal ACM Transactions on Graphics, vol. 28, Issue 3, Aug. 2009, pp. 64:1-64:8.

Jones, et al., "RoomAlive: Magical Experiences Enabled by Scalable, Adaptive Projector-Camera Units", In Proceedings of the 27th Annual ACM Symposium on User Interface Software and Technology, Oct. 5, 2014, pp. 637-644.

Maimone, et al., "Encumbrance-Free Telepresence System with Real-Time 3D Capture and Display Using Commodity Depth Cameras", In Proceedinsgs of 10th IEEE International Symposium on Mixed and Augmented Reality, Oct. 26, 2011, pp. 137-146.

Maimone, et al., "General-Purpose Telepresence with Head-Worn Optical See-through Displays and Projector-Based Lighting", In IEEE Virtual Reality, Mar. 16, 2013, pp. 23-26.

Parkka, et al., "Activity Classification using Realistic Data from Wearable Sensors", In Journal IEEE Transactions on Information Technology in Biomedicine, vol. 10, Issue 1, Jan. 2006, pp. 119-128.

Raskar, et al., "The Office of the Future: A Unified Approach to Image-Based Modeling and Spatially Immersive Displays", In

(56) References Cited

OTHER PUBLICATIONS

Proceedings of the 25th Annual Conference on Computer Graphics and Interactive Techniques, Jul. 19, 1998, 10 pages.
Sellen, Abigail J., "Speech Patterns in Video-Mediated Conversations", In Proceedings of the SIGCHI Conference on Human Factors in Computing Systems, May 3, 1992, pp. 49-59.
Sherstyuk, et al., "Virtual Roommates in Multiple Shared Spaces", In Proceedings of IEEE International Symposium on Virtual Reality Innovation, Mar. 19, 2011, pp. 81-88.
Short, John, "Social Psychology of Telecommunications", In Publication of John Wiley & Sons Ltd, Jan. 1, 1976, 3 pages.
Sodhi, et al., "BeThere: 3D Mobile Collaboration with Spatial Input", In Proceedings of the SIGCHI Conference on Human Factors in Computing Systems, Apr. 27, 2013, pp. 179-188.
Tang, et al., "VideoWhiteboard: Video Shadows to Support Remote Collaboration", In Proceedings of the SIGCHI Conference on Human Factors in Computing Systems, Apr. 1991, pp. 315-322.
Wellner, Pierre, "Interacting with Paper on the DigitalDesk", In Proceedings of Communications of the ACM, vol. 36, Issue 7, Jul. 1993, pp. 87-96.
Wilson, et al., "Steerable Augmented Reality with the Beamatron", In Proceedings of ACM UIST Symposium, Oct. 7, 2012, 10 pages.
Zillner, et al., "3D-Board: A Whole-Body Remote Collaborative Whiteboard", In Proceedings of the 27th Annual ACM Symposium on User Interface Software and Technology, Oct. 5, 2014, pp. 471-479.
U.S. Appl. No. 61/444,123, Benko, et al., "Combining 3D Projectors with 3D Depth Cameras for Rich Interactive Experiences", filed Feb. 17, 2011.
U.S. Appl. No. 61/307,422, Benko, et al., "Projector and Depth Camera Systems for Device-less Augmented Reality and Interaction", filed Feb. 23, 2010.
U.S. Appl. No. 61/749,779, Benko, et al., "Peripheral Projected Illusions", filed Jan. 7, 2013.
U.S. Appl. No. 61/772,280, Benko, et al., "Steerable Augmented Reality", filed Mar. 4, 2013.
International Preliminary Report on Patentability, issued in PCT Application No. PCT/US2016/019442, dated May 2, 2017, 8 pages.
International Preliminary Examining Authority Issued for PCT Application No. PCT/US2016/019442 dated Feb. 1, 2017, 7 pages.

* cited by examiner

PROJECTING A VIRTUAL COPY OF A REMOTE OBJECT

BACKGROUND

As network connectivity between computing devices increases, users are communicating using a variety of technologies. For example, many users communicate with videoconferencing software that enables remote users to interact via audio and video data. However, videoconferencing software displays a remote user in two dimensional space, and remote users cannot perform joint, spatially situated activities. Therefore, facilitating co-present interaction between remote users in separate locations cannot be accomplished using videoconferencing software.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a method for projecting a remote object. The method can include collecting environment data corresponding to a local environment in which a system is located and detecting a remote object corresponding to a remote user in a remote environment. The method can also include detecting a viewpoint of a local user in the local environment and projecting a virtual copy of the remote object corresponding to the remote user in the local environment based on the viewpoint of the local user.

Another embodiment provides one or more computer-readable storage media for projecting a remote object. The computer-readable storage media can include a plurality of instructions that, when executed by a processor, cause the processor to collect environment data corresponding to a local environment in which a system is located. The instructions can also cause the processor to detect a remote object corresponding to a remote user in a remote environment and detect a viewpoint of a local user in the local environment. Furthermore, the instructions can cause the processor to project the remote object corresponding to the remote user in the local environment based on the viewpoint of the local user and identified locations in the local environment on which the remote object can be projected.

Another embodiment provides a system for projecting a remote object. The system can include a first module to calibrate the system, the calibration comprising collecting environment data corresponding to a local environment in which the system is located. The system can also include a second module to detect a remote object corresponding to a remote user in a remote environment. Additionally, the system can include a third module to detect a viewpoint of a local user in the local environment. Furthermore, the system can include a fourth module to project a virtual copy of the remote object in the local environment based on the viewpoint of the local user.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Techniques for projecting a virtual copy of a remote object are described herein. A virtual copy, as referred to herein, can include a representation of a user, or any other suitable animate or inanimate object. For example, a virtual copy may include an image of a person, an animal, or any suitable fixed object. In some examples, the virtual copy can include a life-size image of a remote user. In some embodiments, the virtual copy of a remote object can be projected based on an orientation of users in a local environment. An environment, as referred to herein, can include the layout and configuration of a space in which a computing device for projecting a remote object is located. For example, an environment can indicate the location of furniture in a space, the location of individuals in a space, and the location of fixed surfaces in a space such as walls and floors, among others. The techniques described herein can enhance user interaction between multiple environments by projecting a virtual copy of a remote object in a local environment based on the orientation or viewpoint of a local user in the local environment.

Figure 1:
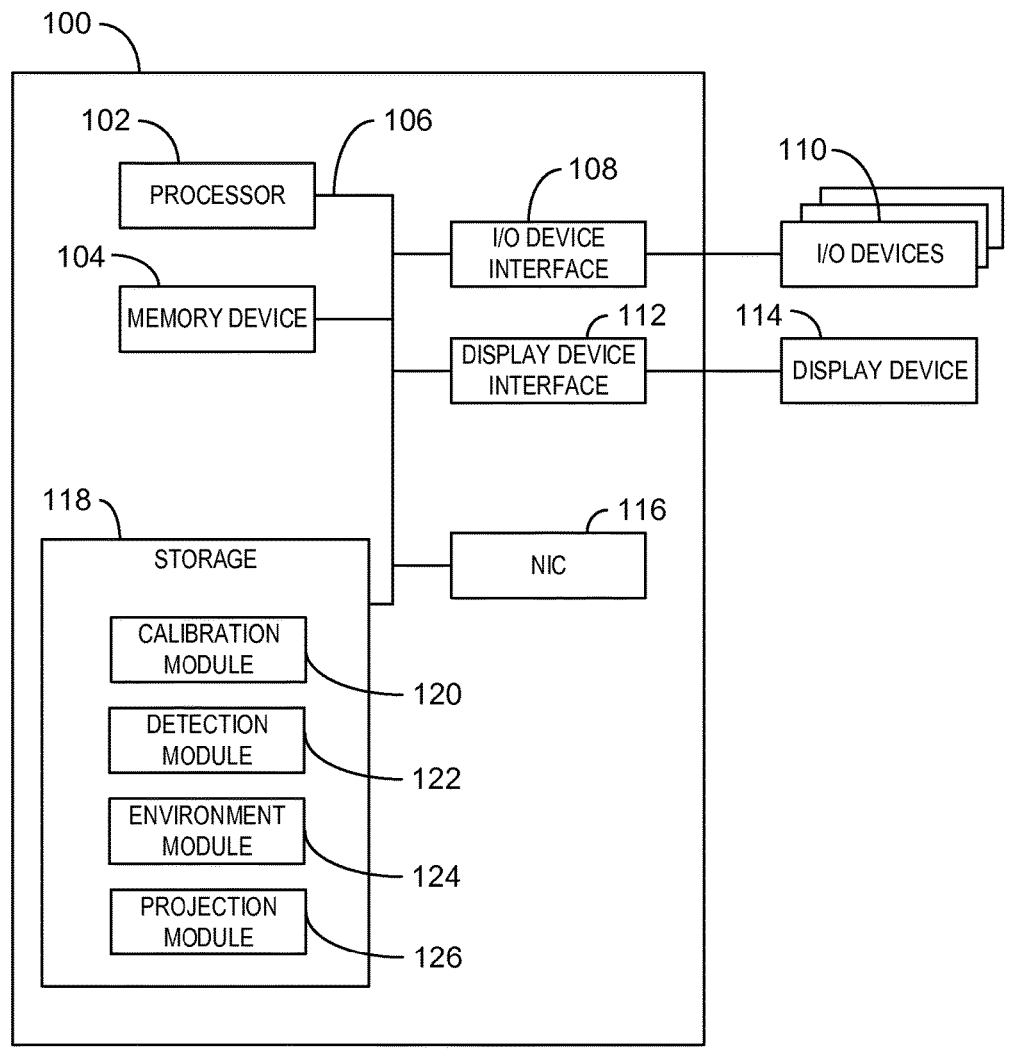
FIG. 1 is a block diagram of an example of a computing system that can project a remote object.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can project a remote object. The computing system 100 may be, for example, a mobile phone, laptop computer, desktop computer, or tablet computer, among others. The computing system 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The instructions that are executed by the processor 102 may be used to project a remote object.

The processor 102 may be connected through a system bus 106 (e.g., PCI, ISA, PCI-Express, NuBus, etc.) to an input/output (I/O) device interface 108 adapted to connect the computing system 100 to one or more I/O devices 110. The I/O devices 110 may include, for example, a keyboard, a gesture recognition input device, a voice recognition device, and a pointing device, wherein the pointing device may include a touchpad or a touchscreen, among others. The I/O devices 110 may be built-in components of the computing system 100, or may be devices that are externally connected to the computing system 100.

The processor 102 may also be linked through the system bus 106 to a display device interface 112 adapted to connect the computing system 100 to a display device 114. The display device 114 may include a display screen that is a built-in component of the computing system 100. The display device 114 may also include a computer monitor, television, or projector, among others, that is externally connected to the computing system 100. A network interface card (NIC) 116 may also be adapted to connect the computing system 100 through the system bus 106 to a network (not depicted).

The storage 118 can include a hard drive, an optical drive, a USB flash drive, an array of drives, or any combinations thereof. The storage 118 may include a calibration module 120, a detection module 122, an environment module 124, and a projection module 126. In some embodiments, the calibration module 120 can calibrate a system, such as computing system 100, by collecting environment data. For example, the calibration module 120 can detect depth data, color data, and skeletal data regarding objects in a surrounding environment or space. The depth data, skeletal data, and color data can be combined to detect objects in the environment of a system. In some embodiments, objects can be detected based on color data and three dimensional data. Three dimensional data may include depth data and/or skeletal data. Skeletal data, as referred to herein, can include data indicating a size and shape of a user, while depth data can include data indicating the location of a user in an environment. Color data can indicate a color associated with any number of points or pixels captured in an environment. The calibration module can capture the color data, skeletal data, and depth data for objects that can include users, furniture, and fixed surfaces, among others. The storage 118 can also include a detection module 122 that can detect a remote object in a remote environment that is to be projected in a local environment. In some examples, the detection module 122 detects the remote object by scanning predetermined locations in the remote environment, analyzing environment data from the remote environment, or detecting a moving object, such as a user, in the remote location, among others.

The storage 118 can also include an environment module 124 that can detect a viewpoint of a local user in the local environment. In some examples, the viewpoint of the user can indicate a gaze or direction in which the local user is looking. Additionally, the storage 118 can include a projection module 126 that can project a virtual copy of the remote object corresponding to the remote user in the local environment based on the viewpoint of the local user.

It is to be understood that the block diagram of FIG. 1 is not intended to indicate that the computing system 100 is to include all of the components shown in FIG. 1. Rather, the computing system 100 can include fewer or additional components not illustrated in FIG. 1 (e.g., additional applications, additional modules, additional memory devices, additional network interfaces, etc.). Furthermore, any of the functionalities of the calibration module 120, detection module 122, environment module 124, and projection module 126 may be partially, or entirely, implemented in hardware and/or in the processor 102. For example, the functionality may be implemented with an application specific integrated circuit, in logic implemented in the processor 102, or in any other device.

Figure 2:
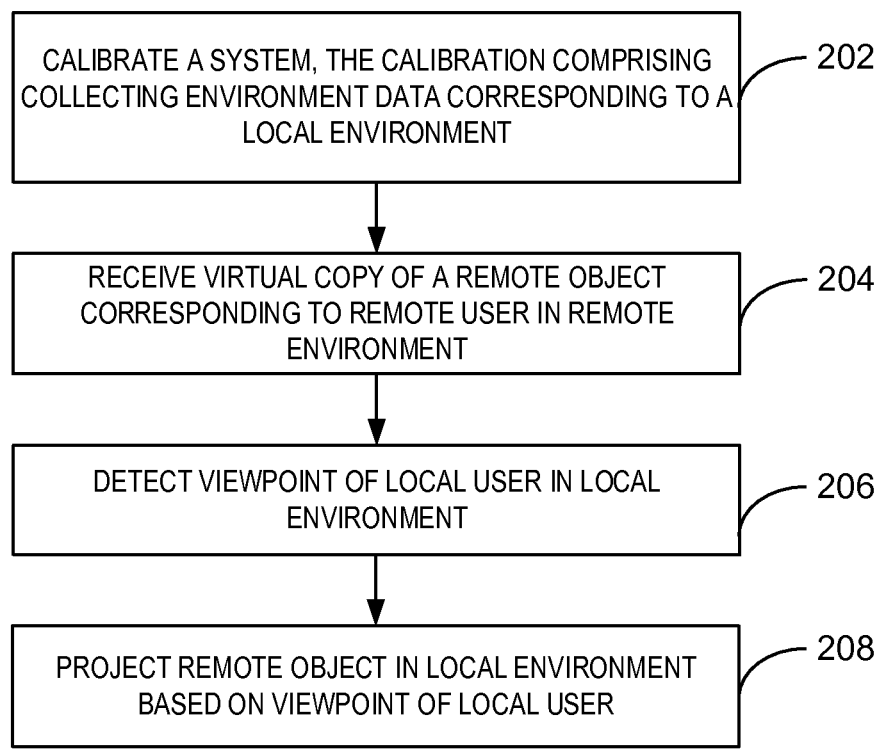
FIG. 2 is a process flow diagram of an example method for projecting a remote object.

FIG. 2 is a process flow diagram of an example method for projecting a remote object. The method 200 can be implemented with any suitable computing device, such as the computing device 100 of FIG. 1.

At block 202, a calibration module 120 can calibrate a system, the calibration comprising collecting environment data corresponding to a local environment in which the system is located. Environment data can include data related to physical objects and individuals within a space in which a system or computing device is located. For example, the environment data can indicate the location of inanimate objects, such as chairs, furniture, or other objects in the space. The environment data can also indicate fixed surfaces, such as walls, floors, and ceilings, within the space. Additionally, the environment data can indicate a location of users or individuals in relation to inanimate objects in the space. The environment data can also include skeletal data, color data, and depth data related to any individuals identified in the local environment.

In some embodiments, the environment data can indicate any suitable information related to positioning or rendering a virtual object. For example, the environment data can include information related to illuminated areas in an environment that may not be suitable for projection of a virtual object, optical see-through glasses that may not be suitable for projection of a virtual object, information related to busy areas in an environment that may not be suitable for projection of a virtual object, information related to dark colored areas in an environment, or information related to areas in an environment that are not easily visible by local users, and the like.

In some examples, the environment data can also indicate locations in which individuals can be positioned during a meeting. For example, the environment data may indicate chairs in which individuals can be seated during a meeting, or areas in which individuals may be standing during a meeting. In some embodiments, the local environment can include an area surrounding a computing device or system, wherein the area is a predetermined size. For example, the local environment may be predetermined to include an amount of space in any suitable direction from the system. In some examples, the local environment may be configurable or adaptable to include an amount of space surrounding the system that includes any number of fixed surfaces or walls of a room.

At block 204, a detection module 122 can receive a virtual copy of a remote object corresponding to a remote user in a remote environment. A remote environment, as used herein, includes a space surrounding a remote computing device, wherein the remote environment is separate or disjoint from the local environment. For example, the remote environment may include space in a room that is separate from the room in which the local environment is located. In some embodiments, a remote object can include any suitable animate object or inanimate object, such as individuals, game pieces, or animals, among others. The remote object represents an object from the remote environment that is to be projected into the local environment. In some embodiments, the remote object can also include objects previously recorded in a remote environment. For example, the remote object can include a recording of a remote user that can be projected in a local environment. In some embodiments, the remote object may also be captured or recorded using chroma key compositing techniques. In some embodiments, the remote object is displayed in a local environment using chroma key compositing when depth cameras are unavailable. In some examples, the remote object can be stored in a computer-generated image format that enables a projection of a virtual copy of the remote object as an avatar.

In some embodiments, the detection module 122 can detect the remote object from received data from a remote environment using various techniques such as generating a user index that labels remote objects in a remote environment as users. For example, the detection module 122 may identify users in received data from a remote environment during a configuration time period based on user movements. Alternatively, the detection module 122 can detect remote objects that have moved in a remote environment by capturing and comparing two images of the remote environment. For example, the detection module 122 may detect a remote object on a fixed surface, such as furniture, by detecting that the remote object did not exist in a previously captured image of the remote environment.

At block 206, an environment module 124 can detect a viewpoint of a local user in the local environment. In some embodiments, the environment module 124 can detect a user in the local environment based on the environment data. For example, the environment module 124 may analyze the environment data to identify a user based on movement in the local environment. In some examples, the environment module 124 can analyze the environment data to detect the viewpoint or gaze of a user in the local environment based on skeletal data, depth data, or color data corresponding to the user. For example, the environment module 124 can indicate the orientation of a user in relation to locations in the local environment in which other users may be situated or located during a meeting. In some examples, the viewpoint of a user can indicate that the user is looking towards a chair or space in which another user may be located during a meeting.

In some examples, the environment module 124 can also identify locations in the local environment on which the remote object can be projected based on surface attributes. The surface attributes, as referred to herein, can indicate if a fixed surface is translucent or reflective, among others. In some embodiments, the remote object may not be projected on surfaces that are translucent or reflective. The environment module 124 can also generate a score for each surface based on attributes of the surface such as color, texture, orientation to local users, visibility to a local user, amount of light that is cast on the surface, and the semantic context, among others. In some examples, a virtual copy of a remote object may not be projected on surfaces that have a score below a threshold value.

At block 208, a projection module 126 can project a virtual copy of the remote object corresponding to the remote user in the local environment based on the viewpoint of the local user. In some embodiments, the projection module 126 can project the remote object in predetermined locations in the local environment based on the viewpoint of the user in the local environment. For example, the projection module 126 can project the remote object on predetermined furniture or against fixed surfaces depending on the viewpoint of the user in the local environment. In some embodiments, the projection module 126 can position the virtual copy of the remote object in the local environment by taking into account geometry of local objects in the local environment. For example, the projection module 126 can detect three dimensional data related to the geometry of local objects in the local environment and position the projection of the virtual copy based on the geometry of the local objects. The local objects can include furniture, walls, ceilings, floors, or any other suitable surface on which the virtual copy can be projected. In some examples, the projection module 126 can position the virtual copy to be projected on a local object by detecting a local object with an appropriate surface on which to project the virtual copy. In some examples, positioning the virtual copy can be based on predetermined locations in the local environment.

In some embodiments, the projection module 126 can rotate the remote object based on the viewpoint of the local user. For example, the projection module 126 can detect that a local user has rotated or turned their head and the projection module 126 can respond by rotating the projection of the remote object to match the rotation of the local user. Rotating a virtual copy of a remote object based on the viewpoint of the local user can enable a virtual face to face orientation of the local user and the remote user. In some embodiments, the projection module 126 can rotate a virtual copy of a remote object based on a field of view of the local user. For example, the projection module 126 can rotate a virtual copy of a remote object so that a field of view of a remote object and a field of view of a local user are aligned as if the local user and the remote object are facing one another. In addition to rotating a virtual copy of a remote object, the projection module 126 can also apply any suitable keystone correction technique to the virtual copy in order to skew the virtual copy to appear rectangular to a local user.

In some embodiments, the projection module 126 can project the virtual copy of the remote object by generating mesh data of the remote object, detecting a surface to project the virtual copy of the remote object in the local environment, and modifying the mesh data based on the environment data. Mesh data, as referred to herein, includes data points indicating a three dimensional representation of a remote object. In some embodiments, the projection module 126 can detect that a location in the local environment for projecting the virtual copy of the remote object includes a piece of furniture. The projection module 126 may modify the mesh data of the remote object so that the virtual copy of the remote object is projected in a format that conforms to the size of the furniture in the local environment. For example, the projection module 126 can modify the depth data, color data, and/or skeletal data for the remote object. In some examples, the projection module 126 can also modify the mesh data of a remote object so that the virtual copy of the remote object is projected at a suitable size for a fixed surface that accommodates standing projections of a remote user. The projection module 126 can also modify the mesh data to retarget a virtual copy of a remote object, or correct deformations in the mesh data by generating synthetic information to fill the deformations, and the like.

In some embodiments, the projection module 126 can use a combination of graphics processing unit (GPU) vertex and pixel shaders, which convert three dimensional environment data for a remote object into a triangle mesh. The projection module 126 can also render the triangle mesh with color data and transform or warp the textured triangle mesh according to the environment data for the local environment, such as furniture and fixed surfaces, and the like.

The process flow diagram of FIG. 2 is not intended to indicate that the steps of the method 200 are to be executed in any particular order, or that all of the steps of the method 200 are to be included in every case. Further, any number of additional steps may be included within the method 200, depending on the specific application. For example, the projection module 126 can also project the local user as a separate remote object in the remote environment. Additionally, the projection module 126 can detect a conflict with a location in the local environment in which the virtual copy of the remote object is projected, and move the location of the projection of the remote object in the local environment to a retargeted location in the local environment. For example, a conflict may indicate that a local user has moved into the space in which the remote object is projected, projection visibility has decreased due to a light that has entered the space in which the remote object is to be projected, or another object may have moved into the space or location in which the remote object is projected. In response, the projection module 126 can detect a retargeted location in the local environment to project the remote object. The retargeted location may include a second predetermined location to project the remote object, or a second location dynamically determined based on environment data, among others.

The projection module 126 can also detect that the remote user is in a static position prior to projecting the remote object corresponding to the remote user. For example, the projection module 126 may wait for a remote user to enter a fixed static state before projecting the virtual copy of the remote object corresponding to the remote user. The fixed static state can indicate that a user is in a predetermined position such as a sitting position or a standing position, among others. In some examples, the fixed static state can allow for a predetermined amount of movement by the remote user within a predetermined position. In some embodiments, the projection module 126 can project the remote object of the remote user based on movements of the remote user.

Figure 3:
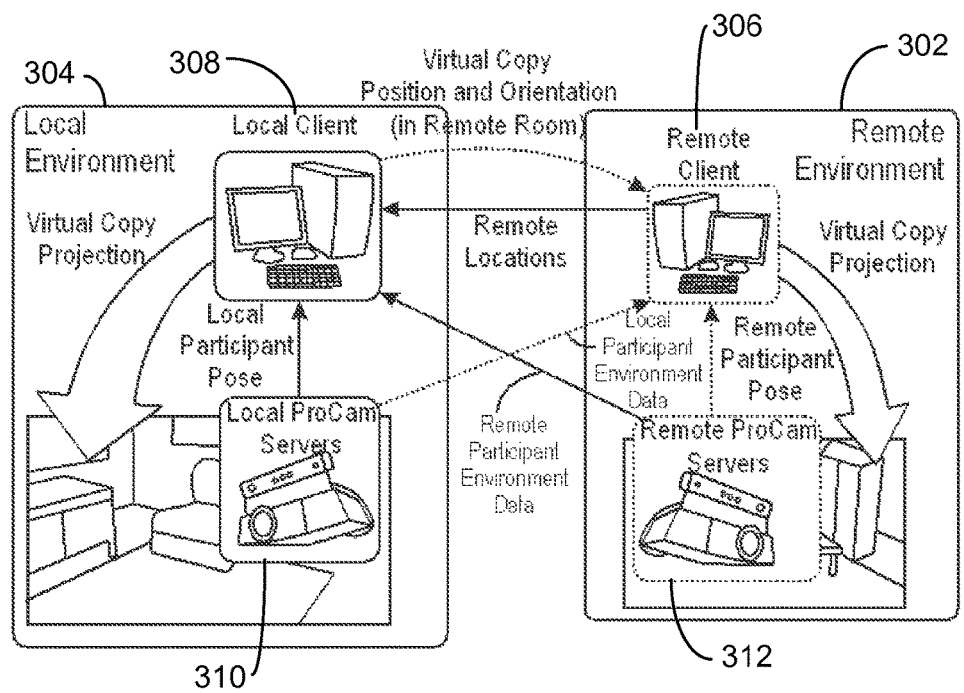
FIG. 3 is an illustration of projecting remote objects in a remote environment and a local environment.

FIG. 3 is an illustration of projecting remote objects in a remote environment and a local environment. In some embodiments, the remote environment 302 and the local environment 304 each include client devices that can transmit data. For example, the remote environment 302 can include a remote client device 306 and the local environment 304 can include a local client device 308. In some examples, the remote client device 306 and the local client device 308 can be any suitable computing device, such as the computing device 100 of FIG. 1. In some examples, the remote client device 306 and the local client device 308 can be connected to projection servers (also referred to as procam servers), such as projection servers 310 and 312 respectively. The projection servers 310 and 312 can collect environment data in the surrounding environment and transmit the environment data to the remote client device 306 and the local client device 308. The data can be transmitted using any suitable data protocol such as a Transmission Control Protocol/Internet Protocol (TCP/IP) or a User Datagram Protocol (UDP) via network sockets and any suitable compression technique. As discussed above, the environment data can include skeletal data and three dimensional data such as depth data, and color data. In some embodiments, the environment data indicates the presence of users or individuals in the remote environment 302 and/or the local environment 304. For example, the projection servers 310 and 312 can detect a remote object that resembles a user or an individual. The projection servers 310 and 312 can then detect an orientation of a user based on the environment data. For example, the orientation can indicate that the remote object or user is in a sitting position, in a standing position, or situated in any other suitable position. The environment data can also indicate affordances such as chairs or standing locations, locations of light sources, or semantic information such as locations of doors, white boards, and the like. In some embodiments, the environment data can be detected in an environment over time or the environment data can be predetermined.

The local client device 308 and the remote client device 306 may receive the orientation of the remote object from the projections servers 310 or 312. The local client device 308 and the remote client device 306 may also receive the environment data from projection servers 310 and 312. In some examples, the local client device 308 can receive environment data from the projection server 310 in the remote environment 302 and the remote client device 306 can receive environment data from the projection server 312 in the local environment.

In some embodiments, the local client device 308 and the remote client device 306 can determine the orientation of the remote object to be projected in a separate environment. For example, the orientation can indicate a position or pose of the remote object such as whether the remote object is a sitting user, a standing user, or a user in any other position. Additionally, the local client device 308 and the remote client device 306 can detect the seating arrangements or available locations for projecting a remote object and transmit instructions to the corresponding projection server 310 or 312 to project a virtual copy of the remote object based on a user's viewpoint in the environment.

Figures 4A, 4B, 4C:
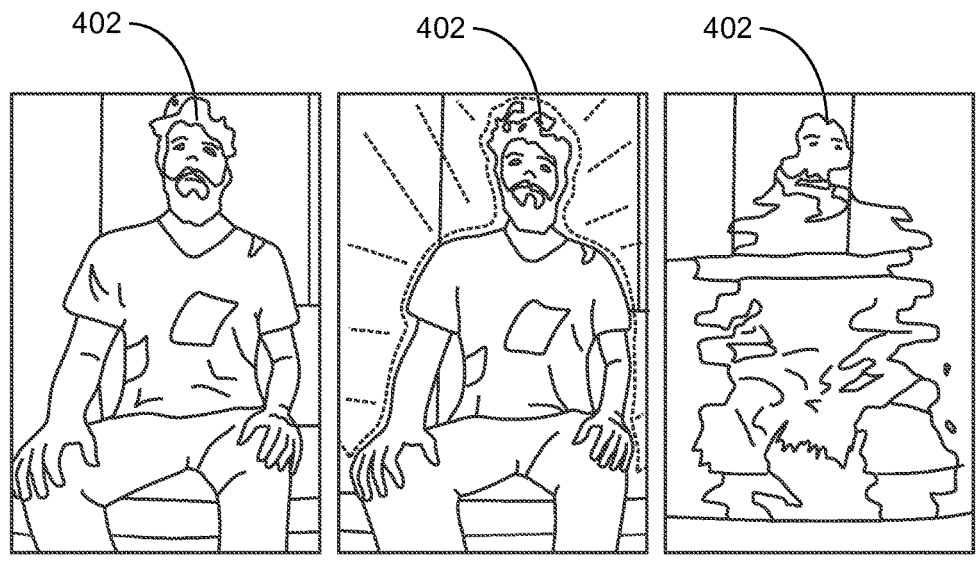
FIG. 4A is an illustration of an example projection of a virtual copy of a remote object.
FIG. 4B is an illustration of an example virtual copy of a remote object with an applied effect.
FIG. 4C is an illustration of an example virtual copy of a remote object with a shade.

FIG. 4A is an illustration of an example projection of a virtual copy of a remote object. In the example of FIG. 4A, the virtual copy 402 of a remote object is a user physically located in a remote environment, but projected within a local environment. The virtual copy 402 is projected in a sitting position within a location in the local environment that corresponds to users in a sitting position. For example, the virtual copy 402 can be projected on any suitable chair or other furniture which facilitates sitting users.

FIG. 4B is an illustration of an example virtual copy of a remote object with an applied effect. In some embodiments, the projection module 126 can generate an effect for the virtual copy 402 based on a state of the system projecting the virtual copy. For example, the projection module 126 can apply effects to a virtual copy 402, wherein the effects comprise saturating the virtual copy 402 and adding a blue tint, applying rim lighting of the virtual copy 402, and adding a scan line to the virtual copy 402, among others. In some embodiments, the effects can include any suitable non-photorealistic effect. In FIG. 4B, the virtual copy 402 includes a rim lighting effect, which illuminates the outline of the virtual copy 402. In some embodiments, the virtual copy 402 can also include a scan line that adds depth and shape cues to the virtual copy 402. The scan line can also add temporal smoothness to the virtual copy 402 in embodiments in which the projection module 126 refreshes depth data more frequently than color data.

FIG. 4C is an illustration of an example virtual copy of a remote object with a shader effect. The shader effect can include a variation in brightness along a horizontal line of the virtual copy of the remote object, among others. The shader effect can also modulate the skeletal data or three dimensional geometry of the virtual copy 402 rather than only modulating color data used to render the virtual copy 402. In some embodiments, the projection module 126 can render a visual effect (also referred to herein as a shader effect) for the virtual copy 402 based on a state of the system, wherein the state includes latency data or retargeting data. For example, the projection of the virtual copy 402 with a shader effect can indicate to local viewers that the clarity of the virtual copy 402 may be diminished due to network issues, or retargeting. Retargeting, as referred to herein, includes transitioning the projection of a remote object from a first location in a local environment to a second location in the local environment. For example, the projection module 126 can detect that a viewer or any other suitable obstacle is currently preventing a correct projection of the virtual copy 402 in a first location in the local environment. The projection module 126 can detect a second location for projecting the virtual copy 402 in the local environment and transition the projection of the virtual copy 402 from the first location to the second location. In some embodiments, the second location is based on a viewpoint of a local user in the local environment. The second location can also be based on any suitable constraint such as proximity to a projection surface, relationship of the orientation of the second location to the local user, and the like.

Figure 5:
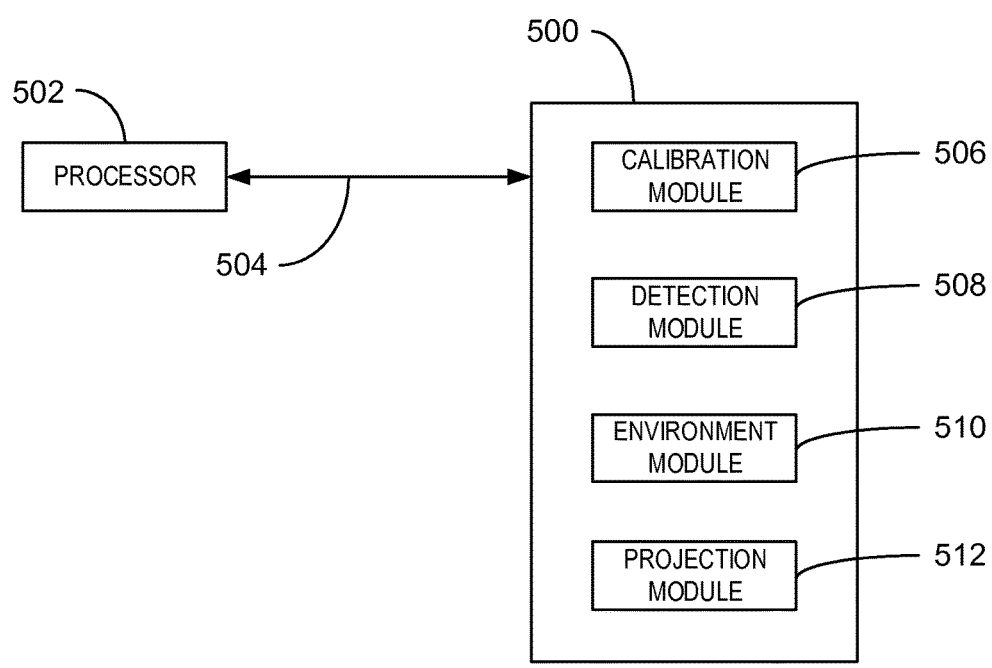
FIG. 5 is a block diagram of an example computer-readable storage media that can project a remote object.

FIG. 5 is a block diagram showing a tangible, computer-readable storage media that can project a remote object. The tangible, computer-readable storage media 500 may be accessed by a processor 502 over a computer bus 504. Furthermore, the tangible, computer-readable storage media 500 may include code to direct the processor 502 to perform the steps of the current method.

The various software components discussed herein may be stored on the tangible, computer-readable storage media 500, as indicated in FIG. 5. For example, the tangible computer-readable storage media 500 can include a calibration module 506 can calibrate a system by collecting environment data. For example, the calibration module 506 can detect depth data, color data, and skeletal data regarding objects in a surrounding environment or space. The objects can include users, furniture, and fixed surfaces, among others. The tangible computer-readable storage media 500 can also include a detection module 508 that can detect a remote object in a remote environment that is to be projected in a local environment. In some examples, the detection module 508 detects the remote object by scanning predetermined locations in the remote environment or detecting a moving object in the remote location, among others.

The tangible computer-readable storage media 500 can also include an environment module 510 that can detect a viewpoint of a local user in the local environment. In some examples, the viewpoint of the user can indicate a gaze or direction in which the local user is looking. Additionally, the tangible computer-readable storage media 500 can include a projection module 512 that can project the remote object corresponding to the remote user in the local environment based on the viewpoint of the local user.

It is to be understood that any number of additional software components not shown in FIG. 5 may be included within the tangible, computer-readable storage media 500, depending on the specific application. Although the subject matter has been described in language specific to structural features and/or methods, it is to be understood that the subject matter defined in the appended claims is not necessarily limited to the specific structural features or methods described above. Rather, the specific structural features and methods described above are disclosed as example forms of implementing the claims.

EXAMPLE 1

In one embodiment, a method for projecting a virtual copy of a remote object comprises collecting environment data corresponding to a local environment in which a system is located and receiving the virtual copy of a remote object corresponding to a remote user in a remote environment. The method can also include detecting a viewpoint of a local user in the local environment and projecting a virtual copy of the remote object corresponding to the remote user in the local environment based on the viewpoint of the local user, the virtual copy of the remote object to be positioned in the local environment by taking into account geometry of local objects in the local environment.

Alternatively, or in addition, the method can include identifying locations in the local environment on which the remote object can be projected. In some embodiments, the locations are based on surface attributes. Alternatively, or in addition, the method can include applying effects to the virtual copy, the effects comprising saturating the virtual copy and adding a blue tint, applying rim lighting of the virtual copy, and adding a scan line to the virtual copy. Alternatively, or in addition, the method can include rotating the virtual copy based on the viewpoint of the local user. Alternatively, or in addition, the method can include detecting a conflict with a location in the local environment in which the virtual copy of the remote object is projected, and moving the location of the projection of the virtual copy of the remote object in the local environment to a retargeted location in the local environment.

EXAMPLE 2

Another embodiment provides one or more computer-readable storage media for projecting a virtual copy of a remote object comprising a plurality of instructions that, when executed by a processor, cause the processor to collect environment data corresponding to a local environment in which a system is located. The instructions can also cause the processor to receive the virtual copy of a remote object corresponding to a remote user in a remote environment and detect a viewpoint of a local user in the local environment. Furthermore, the instructions can cause the processor to project the remote object corresponding to the remote user in the local environment based on the viewpoint of the local user and identified locations in the local environment on which the remote object can be projected, the virtual copy of the remote object to be positioned in the local environment by taking into account geometry of local objects in the local environment.

Alternatively, or in addition, the instructions can cause the processor to identify locations in the local environment on which the remote object can be projected. In some embodiments, the locations are based on surface attributes. Alternatively, or in addition, the instructions can cause the processor to apply effects to the virtual copy, the effects comprising saturating the virtual copy and adding a blue tint, applying rim lighting of the virtual copy, and adding a scan line to the virtual copy. Alternatively, or in addition, the instructions can cause the processor to rotate the virtual copy based on the viewpoint of the local user. Alternatively, or in addition, the instructions can cause the processor to detect a conflict with a location in the local environment in which the virtual copy of the remote object is projected, and move the location of the projection of the virtual copy of the remote object in the local environment to a retargeted location in the local environment.

EXAMPLE 3

Another embodiment provides a system for system for projecting a virtual copy of a remote object comprising a first module to calibrate the system, the calibration comprising collecting environment data corresponding to a local environment in which the system is located. The system can also include a second module to receive the virtual copy of a remote object corresponding to a remote user in a remote environment. Additionally, the system can include a third module to detect a viewpoint of a local user in the local environment. Furthermore, the system can include a fourth module to project a virtual copy of the remote object in the local environment based on the viewpoint of the local user, the virtual copy of the remote object to be positioned in the local environment by taking into account geometry of local objects in the local environment.

Alternatively, or in addition, the system can include a module to identify locations in the local environment on which the virtual copy of the remote object can be projected. In some embodiments, the locations are based on surface attributes. Alternatively, or in addition, the system can include a module to apply effects to the virtual copy, the effects comprising saturating the virtual copy and adding a blue tint, applying rim lighting of the virtual copy, and adding a scan line to the virtual copy. Alternatively, or in addition, the system can include a module to rotate the virtual copy based on the viewpoint of the local user and the virtual copy comprises a life size image of the remote user. Alternatively, or in addition, the system can include a module to detect a conflict with a location in the local environment in which the virtual copy of the remote object is projected, and move the location of the projection of the virtual copy of the remote object in the local environment to a retargeted location in the local environment.

Alternatively, or in addition, the third module can identify locations in the local environment on which the remote object can be projected. Alternatively, or in addition, the second module can detect that a remote user is in a static position. In some embodiments, the remote object can include depth, color, and three-dimensional data corresponding to the remote user. Alternatively, or in addition, a fifth module can send the local user as a separate virtual copy for projection in the remote environment. Alternatively, or in addition, the system can include a module that can apply effects to the virtual copy, the effects comprising saturating the virtual copy and adding a blue tint, applying rim lighting of the virtual copy, and adding a scan line to the virtual copy. Alternatively, or in addition, the fourth module can rotate and position the virtual copy based on the viewpoint of the local user. Alternatively, or in addition, the fourth module can generate mesh data of the remote object, detect a surface to project the virtual copy of the remote object in the local environment, and modify the mesh data based on the environment data. In some embodiments, the state of the system comprises latency data or retargeting data.

What is claimed is:

1. A system for projecting a virtual copy of a remote object comprising:
  a processor to:
    calibrate the system, the calibration comprising collecting environment data corresponding to a local environment in which the system is located;
    receive the virtual copy of a remote object corresponding to a remote user in a remote environment;
    detect a viewpoint of a local user in the local environment; and
    project the virtual copy of the remote object in the local environment based on the viewpoint of the local user, the virtual copy of the remote object to be positioned in the local environment by taking into account geometry of local objects in the local environment, wherein the virtual copy of the remote object is to be projected against fixed surfaces in the local environment, wherein the virtual copy of the remote object comprises modified mesh data based on an orientation of the remote user.

2. The system of claim 1, wherein the processor is to identify locations in the local environment on which the virtual copy of the remote object can be projected.

3. The system of claim 2, wherein the processor identifies the locations based on surface attributes.

4. The system of claim 1, wherein the processor detects that the remote user is in a static position.

5. The system of claim 1, wherein the processor rotates and positions the virtual copy based on the viewpoint of the local user and wherein the virtual copy comprises a life size image of the remote user.

6. The system of claim 1 wherein the processor is to send the local user as a separate virtual copy for projection in the remote environment.

7. The system of claim 1, the remote object comprising depth data, color data, and three dimensional data corresponding to the remote user.

8. The system of claim 1, wherein the processor is to:
   detect a surface to project the virtual copy of the remote object in the local environment; and
   modify the mesh data based on the environment data.

9. The system of claim 8, wherein the state of the system comprises latency data or retargeting data.

10. The system of claim 1 wherein the processor is to:
    detect a conflict with a location in the local environment in which the virtual copy is projected; and
    move the location of the projection of the virtual copy of the remote object in the local environment to a retargeted location in the local environment.

11. The system of claim 1, wherein the processor is to apply effects to the virtual copy, the effects comprising a non-photorealistic effect.

12. A method for projecting a virtual copy of a remote object comprising:
    collecting environment data corresponding to a local environment in which a system is located;
    detecting a remote object corresponding to a remote user in a remote environment;
    detecting a viewpoint of a local user in the local environment; and
    projecting a virtual copy of the remote object corresponding to the remote user in the local environment based on the viewpoint of the local user, the virtual copy of the remote object to be positioned in the local environment by taking into account geometry of local objects in the local environment, wherein the virtual copy of the remote object is to be projected on predetermined furniture in the local environment, and wherein the virtual copy of the remote object comprises modified mesh data based on an orientation of the remote user.

13. The method of claim 12, comprising identifying locations in the local environment on which the remote object can be projected.

14. The method of claim 13, wherein the locations are based on surface attributes.

15. The method of claim 12, comprising applying effects to the virtual copy, the effects comprising saturating the virtual copy and adding a blue tint, applying rim lighting of the virtual copy, and adding a scan line to the virtual copy.

16. The method of claim 12, comprising rotating the virtual copy based on the viewpoint of the local user.

17. The method of claim 12, comprising:
    detecting a conflict with a location in the local environment in which the virtual copy of the remote object is projected; and
    moving the location of the projection of the virtual copy of the remote object in the local environment to a retargeted location in the local environment.

18. One or more computer-readable storage media for projecting a virtual copy of a remote object comprising a plurality of instructions that, when executed by a processor, cause the processor to:
    collect environment data corresponding to a local environment in which a system is located;
    detect a remote object corresponding to a remote user in a remote environment;
    detect a viewpoint of a local user in the local environment; and
    project the remote object corresponding to the remote user in the local environment based on the viewpoint of the local user, the virtual copy of the remote object to be positioned in the local environment by taking into account geometry of local objects in the local environment, wherein the virtual copy of the remote object is to be projected on predetermined furniture or against fixed surfaces in the local environment, wherein the virtual copy of the remote object comprises modified mesh data based on an orientation of the remote user.

19. The one or more computer-readable storage media of claim 18, wherein the plurality of instructions, when executed by the processor, cause the processor to apply effects to the virtual copy, the effects comprising saturating the virtual copy and adding a blue tint, applying rim lighting of the virtual copy, and adding a scan line to the virtual copy.

20. The one or more computer-readable storage media of claim 18, wherein the plurality of instructions, when executed by the processor, cause the processor to:
    detect a conflict with a location in the local environment in which the virtual copy is projected; and
    move the location of the projection of the virtual copy in the local environment to a retargeted location in the local environment.

21. The method of claim 12, wherein the virtual copy of the remote object is to be projected in part on a fixed surface in the local environment and in part on the predetermined furniture, wherein the fixed surface comprises at least one wall, a floor, or a ceiling of the local environment.

22. The system of claim 1, wherein the processor is to record the remote object using a chroma key compositing technique.

* * * * *